United States Patent [19]

Nelson et al.

[11] Patent Number: 4,944,367
[45] Date of Patent: Jul. 31, 1990

[54] INJECTION LUBRICATOR WITH PLURAL OUTLETS

[75] Inventors: John Nelson, Durham, N.H.; Robert B. Tosi, Littleton, Colo.

[73] Assignee: Watts FluidAir Div. of Robertshaw Controls Company, Kittery, Me.

[21] Appl. No.: 283,617

[22] Filed: Dec. 13, 1988

[51] Int. Cl.⁵ .............................................. F16N 11/10
[52] U.S. Cl. ........................................ 184/29; 184/35; 184/7.4; 184/55.1
[58] Field of Search ................. 184/29, 39.1, 55.1, 184/54, 7.4, 35, 6.14, 15.3, 71, 72; 417/502, 510

[56] References Cited

U.S. PATENT DOCUMENTS

| | | | |
|---|---|---|---|
| 1,866,206 | 7/1932 | Hajek | 184/29 |
| 2,546,585 | 3/1951 | Caldwell | 184/35 |
| 3,172,578 | 3/1965 | Kemp | 184/7.4 |
| 4,105,095 | 8/1978 | Thrasher, Jr. | 184/29 |
| 4,147,233 | 4/1979 | Smith | 184/29 |
| 4,324,316 | 4/1982 | Thrasher, Jr. et al. | 184/29 |
| 4,609,073 | 9/1986 | Knaebel | 184/7.4 |

Primary Examiner—James C. Yeung
Attorney, Agent, or Firm—Fish & Richardson

[57] ABSTRACT

An injection lubricator including a lubricant pump having a pumping piston actuated by a pneumatic pulse to deliver a pulse of lubricant to a lubricant pump outlet, a lubricant distributor having a lubricant distribution inlet in communication with the lubricant pump outlet, a plurality of lubricant distribution outlets, and switchable flow paths within the distributor to cause one lubricant distribution outlet to be connected to the lubricant distribution inlet at one time, and a pneumatically-actuated piston that advances the lubricant distributor to switch to a different lubrication outlet with the application of each pneumatic pulse.

10 Claims, 2 Drawing Sheets

INJECTION LUBRICATOR WITH PLURAL OUTLETS

BACKGROUND OF THE INVENTION

The invention relates to a lubricator that provides pulses of lubrication to plural outlets.

Injection lubricators are used to inject pulses of lubrication into equipment (e.g., air tools, cylinders, valves, etc.) upon receiving pneumatic pulses, which could be pneumatic pulses being supplied to drive the equipment being lubricated. The lubricators typically employ pistons that are driven by the pneumatic pulses and have adjustable stroke lengths to adjust lubrication pulse volume.

When there are multiple lubrication points, injection lubricator modules can be provided in a stack. The pneumatic pulses are simultaneously provided to all modules, which then simultaneously provide lubricant pulses at their respective outlets.

SUMMARY OF THE INVENTION

In general, the invention features an injection lubricator having a pneumatically-actuated lubricator pump, a lubricant distributor having a plurality of lubricant distribution outlets, and a pneumatically-actuated piston to advance the lubricant distributor. The lubricant pump has a pumping piston that is actuated by a pneumatic pulse to deliver a pulse of lubricant to a lubricant pump outlet. The lubricant pump also has a pneumatic pulse outlet. The lubricant distributor has a lubricant distribution inlet that is in communication with the lubricant pump outlet and switchable flow paths within it to cause one of the lubricant distribution outlets to be connected to the lubricant distribution inlet at one time. The pneumatically-actuated piston advances the lubricant distributor to switch to a different lubricant outlet with the application of each pneumatic pulse received from the pneumatic pulse outlet.

In preferred embodiments, the lubricant distributor includes a movable member that has a single outlet that is moved to different positions at which the single outlet sequentially mates with a plurality of openings in a distribution member. The movable member is rotatably mounted, and its different positions are at different rotational positions. The distribution member includes mating openings at positions facing the rotational positions of the rotatable member outlet and a plurality of outlets at spaced positions that are radially outward of the openings. The rotatable member is driven by the pneumatically-actuated piston via a ratchet and pawl mechanism. There is a check valve provided to relieve pressure in a lubricant chamber including the lubricant distributor. The pneumatically-actuated piston and lubricant distributor are provided as part of a lubricant distribution module that is connected to a lubricant pump module. The lubricant distribution module includes a pneumatic chamber and a lubricant chamber that are each partially defined by the rotatable member.

Other advantages and features of the invention will be apparent from the following description of a preferred embodiment thereof and from the claims.

DESCRIPTION OF THE PREFERRED EMBODIMENT

The preferred embodiment will now be described.

DRAWINGS

STRUCTURE

Figure 1:
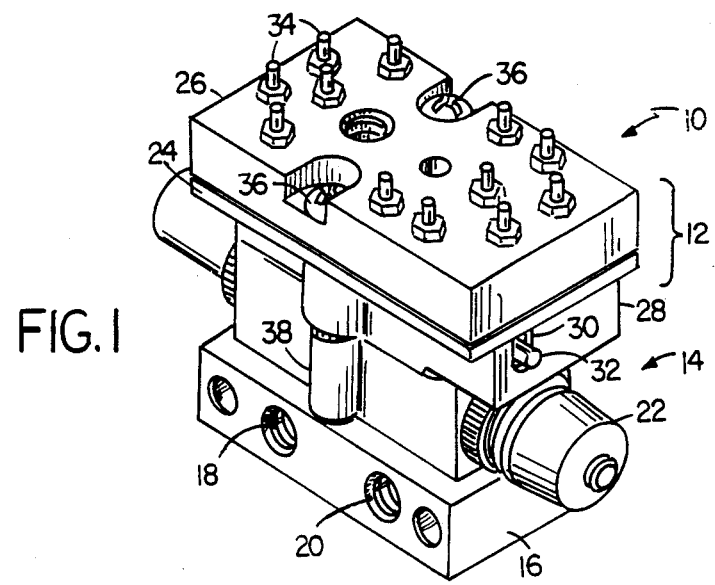
FIG. 1 is a perspective view of an injection lubricator that provides lubricant pulses to a plurality of outlets according to the invention.

Referring to FIG. 1, lubricant injection apparatus 10 includes lubricant distribution module 12, injector module 14, and bottom plate 16. Bottom plate 16 includes threaded opening 18 for connection to a source of lubricant and threaded opening 20 for connection to a source of pneumatic pulses. Injector module 14 includes knob 22 for adjusting the stroke length and thus the stroke volume of its pneumatically-actuated piston (not shown). Lubricant distribution module 12 includes distribution plate 24, injection plate 26, and module body 28, which has opening 30 through which piston shaft 32 extends to indicate movement of a pneumatically-actuated piston (not shown in FIG. 1) therein. Extending from the upper surface of injection plate 26 are 12 lubricant distribution outlets 34 for connection to individual points to be lubricated. Bolts 36 mate with a threaded connection provided on spacers 38, which are in turn threaded into bottom plate 16 to secure the components of apparatus 10 together.

Figure 3:
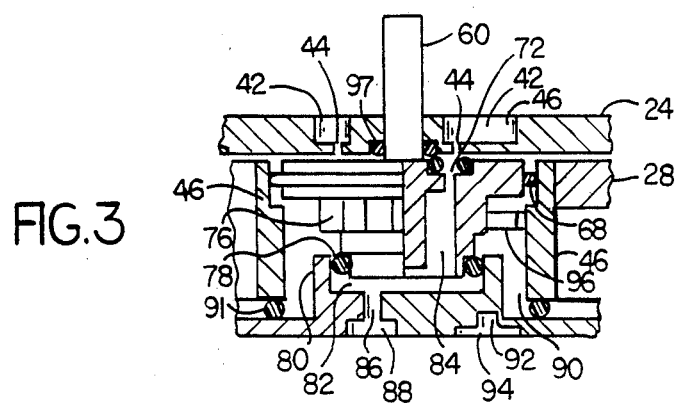
FIG. 3 is a partial, vertical sectional view of a lubricant distributor of the FIG. 1 lubricator with a rotatable member component only partially shown in section.
Figure 2:
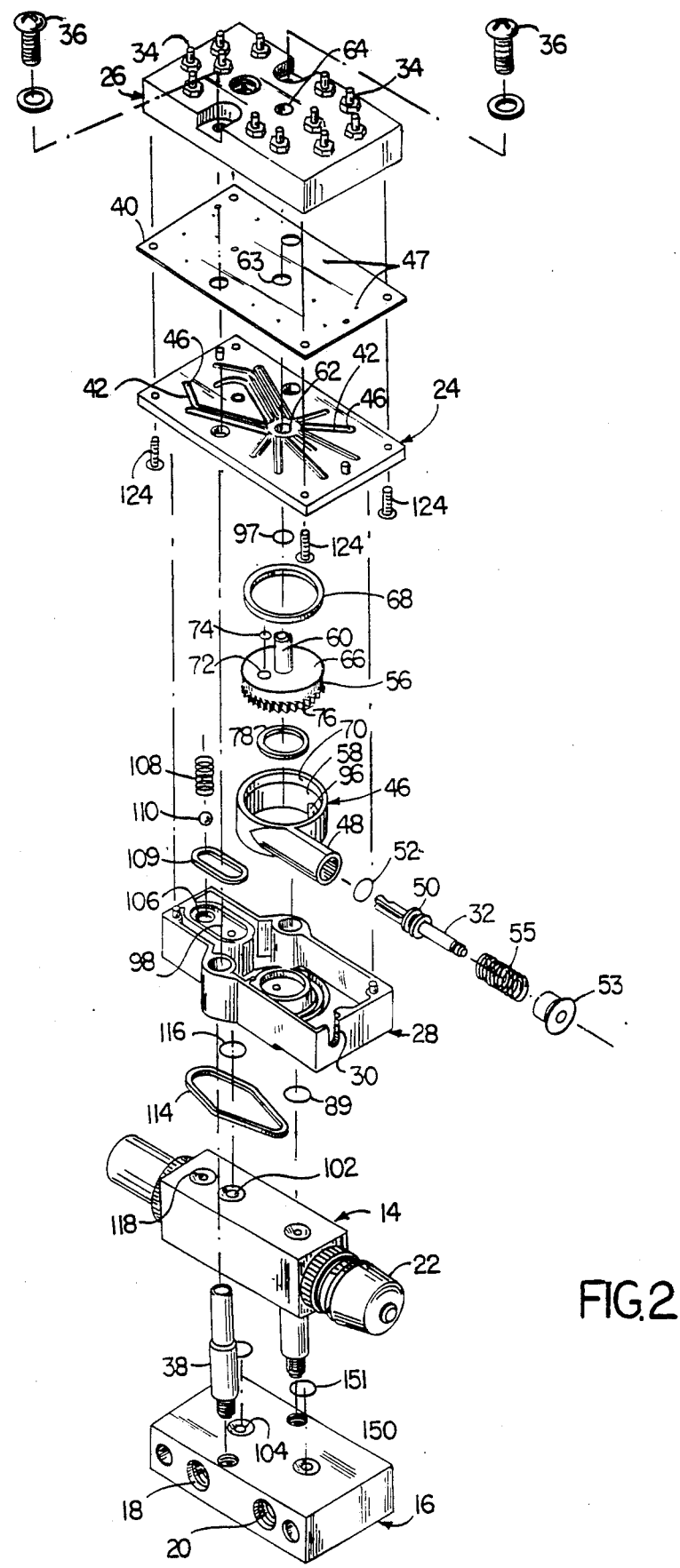
FIG. 2 is an exploded view of the FIG. 1 lubricator.

Referring to FIGS. 2 and 3, gasket 40 is located between distribution member 24 and injection plate 26. Distribution member 24 includes twelve distribution channels provided by elongated recesses 42 formed in its upper surface. Each channel 42 extends from an opening 44 in the lower surface of member 24 to an end 46 aligned with a hole 47 in gasket 40 and the respective distribution outlet 34.

Supported within module body 28 is insert 46. It includes cylindrical extension 48 in which is received piston 50 connected to piston shaft 32. O-ring 52 seals piston 50 to the inner cylindrical surface of extension 48. Piston 50 and its shaft 32 are retained within extension 48 via end cap 53. Compression spring 55 biases piston 50 inward from end cap 53. On the other side of piston 50 from piston shaft 32 is pawl extension 54.

Rotatable member 56 is received within circular cavity 58 of insert 46. Rotatable member 56 includes upwardly extending shaft 60, which passes through holes 62, 63, 64 of distribution member 24, gasket 40, and injection plate 26, respectively. Rotatable member 56 also includes a circular plate 66, the outer periphery of which is sealed via O-ring 68 to annular surface 70 surrounding cavity 58. Rotatable member 56 includes movable outlet 72 which passes from the upper surface of plate 66 through member 56. Movable outlet 72 is sealed by O-ring 74 to the lower surface of distribution module 24. Underneath plate 66 are ratchet teeth 76, which are engaged by pawl extension 54 connected to piston 50.

Figure 4:
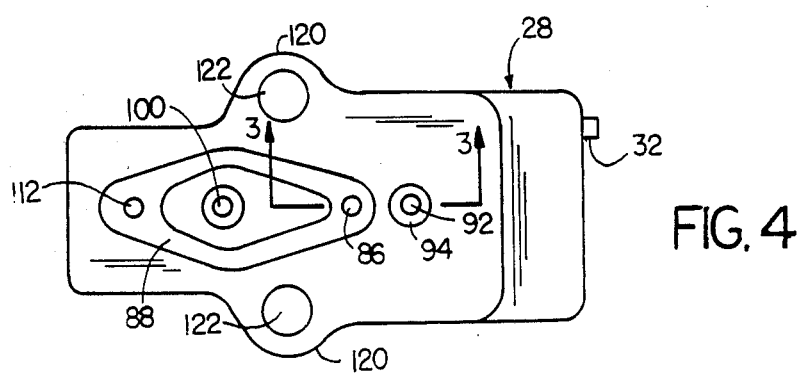
FIG. 4 is a bottom view of a module body of the lubricant distributor of the FIG. 1 lubricator.

Referring to FIGS. 2-4, the lower circular portion of rotatable member 56 is sealed via O-ring 78 to the inner circular surface of upwardly extending circular lip 80. Lubricant chamber 82 is formed by the lower surface of rotatable member 56, the facing upwardly-directed surface of module body 28, and the inner cylindrical surface of circular lip 80. Lubricant chamber 82 communicates with passage 84 within rotatable member 56 to movable outlet 72. Lubricant chamber 82 also communicates with passage 86 through the lower wall of module body 28 leading to recessed channel 88. Recessed channel 88 (FIG. 4) provides a lubricant distribution inlet that is sealed via sealing ring 114 (FIG. 2) to lubricant pump outlet 118 of injector module 14.

Pneumatic chamber 90 is formed by the inner surface of insert 46, the portions of rotatable member 56 below O-ring 68, and the lower wall of module body 28, which is sealed to the bottom of insert 46 via O-ring 91. Pneumatic chamber 90 communicates via passage 92 in the lower wall of module body 28 to recess 94 in the lower surface of module body 28. Recess 94 is sealed via O-ring 89 (FIG. 2) to pneumatic pulse outlet 128 of injector module 14. Pneumatic chamber 90 communicates with a piston chamber within cylindrical extension 48.

Extending inward within insert 46, and formed integrally with insert 46, is resilient locking finger 96 that engages ratchet teeth 76. O-ring 97 seals the outer surface of shaft 60 to the inner surface of distribution member 24.

Formed in the upper surface of module body 28 is elongated recess 98, which communicates with lubricant reservoir passage 100 and pressure relief passage 106 and is sealed to the bottom surface of distribution member 24 by sealing ring 109. Lubricant reservoir passage 102 extends through module body 14 and communicates with lubricant reservoir passage 100, which extends through body 28, and lubricant reservoir passage 104, which extends through bottom block 16 to threaded opening 18. Pressure relief passage 106 receives compression spring 108 and check valve ball 110. Referring to FIG. 4, pressure relief passage 106 communicates with smaller diameter opening 112 in the bottom surface of module body 28. Opening 112 leads to recessed channel 88, which communicates with passage 86 in module body 28. Sealing ring 114 sits within recessed channel 88 around its periphery and seals the bottom surface of module body 28 to the upper surface of injection module 14. O-ring 116 provides a seal between passage 100 in module body 28 and passage 102 in injector module 14. Lubricant pump outlet 118 is in the upper surface of injector module 14 and communicates with recessed channel 88. Module body 28 has ears 120 having holes 122 therethrough for receiving spacers 38. Bolts 124 are used to secure distribution member 24 to injection plate 26. Pneumatic pulse opening 150 in bottom block 16 is sealed via ring 151 to a corresponding opening that is in the bottom of injector module 14 and communicates with pneumatic pulse outlet 128 in the upper surface of injector module 14.

Operation

In operation, a lubricant reservoir is connected to threaded opening 18, a pneumatic pulse source is connected to threaded opening 20, and capillary lubricant flow tubes are connected to lubricant distribution outlets 34. Each time that a pneumatic pulse is supplied to threaded opening 20, and from there through opening 150 to injector module 14, a lubricant pulse is provided at lubricant pump outlet 118, and the pneumatic pulse is passed through lubricant injection module 14 at its pneumatic pulse outlet 128 to passage 92 in the bottom surface of module body 28. The increased pressure caused by the pulse in pneumatic chamber 90 acts to push piston 50 outward, compressing spring 55. At the end of the pneumatic pulse, the pressure within pneumatic chamber 90 decreases, permitting piston 50 and its attached pawl extension 54 to move back to the rest position, engaging a ratchet tooth 76 and incrementally advancing rotatable member 56 in the process. At the end of the incremental rotation, resilient finger 96 moves outward owing to the camming action with a ratchet tooth 76 and engages the following tooth 76, locking rotatable member 56 in its new position. There are twelve ratchet teeth 76, and each incremental rotation of rotatable member 56 places movable outlet 72 under a different opening 44 connected by a respective distribution channel 42 to a different lubricant distribution outlet 34. The pulse of lubricant pumped from lubricant injection module 14 through opening 118 is communicated through recessed channel 88 and passage 86 in the bottom wall of module body 28 to lubricant chamber 82, which in turn communicates through passage 84 in rotatable member 56 to movable outlet 72. The pulse is thus directed through movable outlet 72 to the opening 44 aligned with outlet 72 and the respective lubricant distribution outlet 34. The next pulse is pumped to the next outlet 34 and so on, each outlet 34 receiving a lubricant pulse once for each twelve pneumatic pulses. If one or more lubricant distribution outlets 34 are not used, the outlets are sealed shut. If movable outlet 72 is directed to a channel 42 communicating with an outlet 34 that has been sealed shut, the increase in pressure in lubricant chamber 82 and recessed channel 88 is relieved via movement of check valve ball 110 upward and pumping of the lubricant through recess 98 into the lubricant reservoir passages 100, 102, 104.

Thus, a single injector module 14 is used to distribute lubricant to twelve separate injection points, resulting in a great savings in expense over using twelve injection lubricators 14 in a stack. Because lubricant is provided to each outlet at every twelfth pulse, lubricant can be effectively provided at a flow per pneumatic pulse that is below the minimum setting of the lubricant injector. Thus, a particular advantage of using injection lubricating apparatus 10 is in applications where the lubrication points require less lubricant per pneumatic pulse than is permitted by the minimum stroke volume of the injection module 14.

Other Embodiments

Other embodiments of the invention are within the scope of the following claims.

What is claimed is:

1. An injection lubricator comprising
   a lubricant pump having a pumping piston actuated by a pneumatic pulse to deliver a pulse of lubricant from a lubricant source to a lubricant pump outlet, said pump also having a pneumatic pulse outlet,
   a lubricant distributor having a lubricant distribution inlet in communication with said lubricant pump outlet, a plurality of lubricant distribution outlets, and switchable flow paths within the distributor to cause one said lubricant distribution outlet to be connected to said lubricant distribution inlet at one time, and
   a pneumatically-actuated piston that receives pneumatic pulses from said pneumatic pulse outlet and advances said lubricant distributor to switch to a different lubrication outlet with the application of each pneumatic pulse,
   wherein said lubricant distributor includes a distribution member having a plurality of openings connected via said flow paths to said distribution outlets, and wherein said lubricant distributor includes a movable member that has a single movable outlet that is moved to different positions at which the single movable outlet sequentially mates with a plurality of openings in said distribution member, further comprising means defining a lubricant chamber in communication with said lubricant distribution inlet, and further comprising a check valve providing discharge of a lubricant from said chamber to said lubricant source when pressure in said chamber exceeds a predetermined value.

2. The injection lubricator of claim 1 wherein said movable member is rotatably mounted, said different positions are different rotational positions, said distribution member is a plate having different flow paths formed in it from said openings to respective distribution outlets, said plurality of openings are facing the rotational positions of the movable outlet, and said lubricant distribution outlets are at spaced positions that are radially outward of said openings.

3. The injection lubricator of claim 1 wherein said movable member is driven by said pneumatically-actuated piston via a ratchet and pawl mechanism.

4. The injection lubricator of claim 1 wherein said lubricant distributor, said housing and said pneumatically-actuated piston are provided as part of a lubricant distribution module, and wherein said lubricant pump is a mating injector module.

5. An injection lubricator comprising
a lubricant pump having a pumping piston actuated by a pneumatic pulse to deliver a pulse of lubricant to a lubricant pump outlet, said pump also having a pneumatic pulse outlet,
a lubricant distributor having a lubricant distribution inlet in communication with said lubricant pump outlet, a plurality of lubricant distribution outlets, and switchable flow paths within the distributor to cause one said lubricant distribution outlet to be connected to said lubricant distribution inlet at one time, and
a pneumatically-actuated piston that receives pneumatic pulses from said pneumatic pulse outlet and advances said lubricant distributor to switch to a different lubrication outlet with the application of each pneumatic pulse,
wherein said lubricant distributor includes a distribution member having a plurality of openings connected via said flow paths to said distribution outlets, and wherein said lubricant distributor includes a movable member that has a single movable outlet that is moved to different positions at which the single movable outlet sequentially mates with a plurality of openings in said distribution member,
wherein said lubricant distributor and pneumatically-actuated piston are provided as part of a lubricant distribution module, and wherein said lubricant pump is a mating injector module,
said lubricant pulse outlet and said pneumatic pulse outlet of said injector module having predetermined, fixed relative positions, said lubricant distributor module having a pneumatic pulse inlet, and said lubricant distribution inlet and said pneumatic pulse inlet of said lubricant distributor module having corresponding predetermined fixed relative positions so as to mate with said lubricant pulse outlet and pneumatic pulse outlet.

6. The apparatus of claim 5 wherein said movable member is rotatably mounted in a housing and includes seal means to define a pneumatic chamber and a lubricant chamber with said housing, said pneumatic chamber communicating with said pneumatically-actuated piston, said lubricant chamber providing a lubricant flow path between said lubricant distribution inlet and said movable outlet.

7. The apparatus of claim 6 wherein said housing has a first surface that mates with a second surface of said injector module, and wherein said first surface has a recessed channel providing said lubricant distribution inlet.

8. The apparatus of claim 7 wherein said injector module has a first lubricant reservoir passage extending through it to a lubricant reservoir opening in said second surface, and wherein said housing has a second lubricant reservoir passage that communicates with said lubricant reservoir opening, and further comprising a check valve providing discharge of lubricant from said lubricant chamber to said second lubricant reservoir passage.

9. The apparatus of claim 8 wherein said lubricant chamber communicates with said check valve through said recessed channel.

10. The apparatus of claim 9 wherein said housing has a third surface with a recess in it that is covered by said distribution member, and wherein said check valve communicates with said second lubricant reservoir passage through said recess.

* * * * *